W. H. COLES.
OVERHEAD IRRIGATING DEVICE.
APPLICATION FILED JULY 2, 1919.

1,383,449. Patented July 5, 1921.

Inventor:
Warren H. Coles
By Allen & Allen
Attorneys

UNITED STATES PATENT OFFICE.

WALTER H. COLES, OF TROY, OHIO.

OVERHEAD IRRIGATING DEVICE.

1,383,449. Specification of Letters Patent. Patented July 5, 1921.

Application filed July 2, 1919. Serial No. 308,085.

*To all whom it may concern:*

Be it known that I, WALTER H. COLES, a citizen of the United States, and a resident of the city of Troy, in the county of Miami and State of Ohio, have invented certain new and useful Improvements in Overhead Irrigating Devices, of which the following is a full, clear, and exact description, reference being had to the drawings accompanying this specification.

My invention relates to irrigating systems wherein a series of parallel pipes are mounted transversely of a field, and a series of fine nozzles secured in the pipes for sprinkling the field with a fine spray of water. It applies more particularly to such devices where the transverse parallel pipes are rotatable axially thereby permitting a complete and even distribution of water over the desired surface.

It is the particular object of this invention to provide a new and useful end or terminal nozzle for an irrigating system of the above character. The difficulty with any system of complete water distribution from overhead is that the wind must be allowed for, since the result of a breeze blowing lengthwise of the pipes would be to deprive the windward side of any field to be sprinkled, of any water.

According to my invention, therefore, I provide, in combination with long revoluble pipes having spray nozzles distributed throughout their length, for terminal spray nozzles having independent valves, directed so as to throw the spray outside the area to be covered.

My object and its attendant advantages I accomplish by that certain construction and arrangement of parts to be hereinafter more specifically pointed out and claimed.

The illustration of a removable sprinkling line has been selected merely for the purpose of a simple representation and not because of any particular feature of the pipe or its details except as noted. Thus there are a set of any desired form of standards 1 extending across a field upon which is revolubly mounted a sprinkling pipe 2 which has a series of spray nozzles 3 of any desired type, but adapted to throw a very minute jet of water. These nozzles are spaced equidistant from each other, this distance being calculated so that the water is evenly and uniformly distributed over the surface of the field to be irrigated. The handle 4 is shown as indicating some method of revolving the pipe 2, as will be readily understood.

There may be any desired number of sprinkling lines distributed across the field to be irrigated, and revolved by some sort of mechanisms simultaneously in order to evenly and uniformly sprinkle the desired area.

In the past, the spacing of the nozzles and the speed of revolution thereof have been worked with great particularity but I have noted, as has been above set forth, that a cross wind when blowing along the length of the sprinkling lines will disturb this distribution along the windward side of the field.

Accordingly I provide a special nozzle at one or both ends of the sprinkling lines which is directed so as to throw the jet outside of the field when the air is still.

Figure 3:
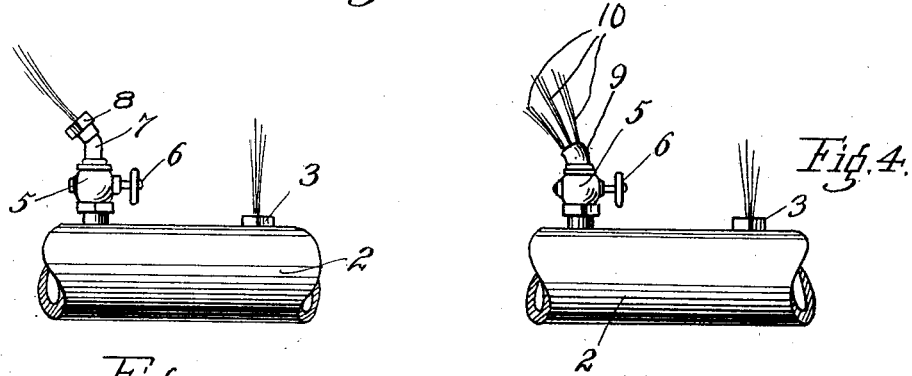
Fig. 3 is a detail elevation showing the new terminal sprinkling nozzle and faucet.

As an example of such a device, I show in Fig. 3 a small bib or faucet 5 screwed into the pipe 2 with the valve therein controlled by the handle 6. Mounted suitably in the spout portion 7 of the bib is one of my spray nozzles 8, (such for example, as I show in my Patent No. 1,126,707, dated February 2, 1915.

It will be noted that the nozzle 8 extends at a considerable angle to the regular nozzles 3, the exact angle being dependent upon which end of the pipe this special nozzle is located and upon the usual factors of water pressure and area to be covered.

Figure 1:
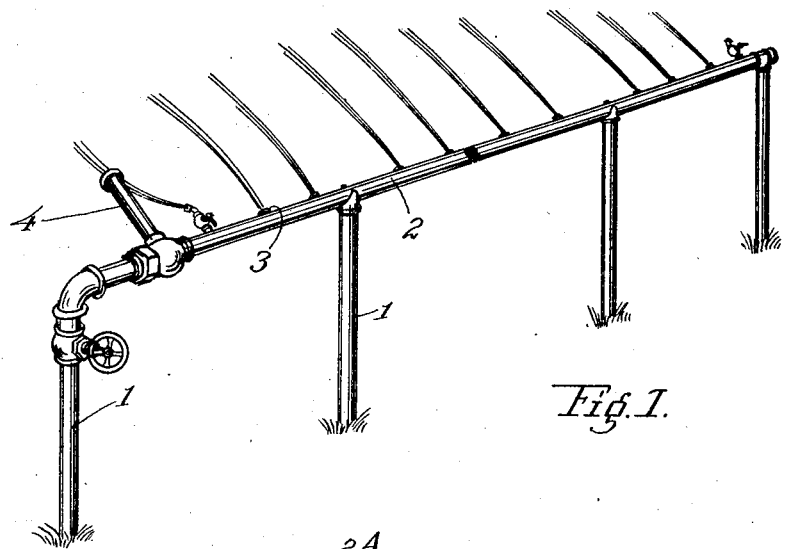
Figure 1 is a perspective view showing a single revoluble sprinkling line.
Figure 2:
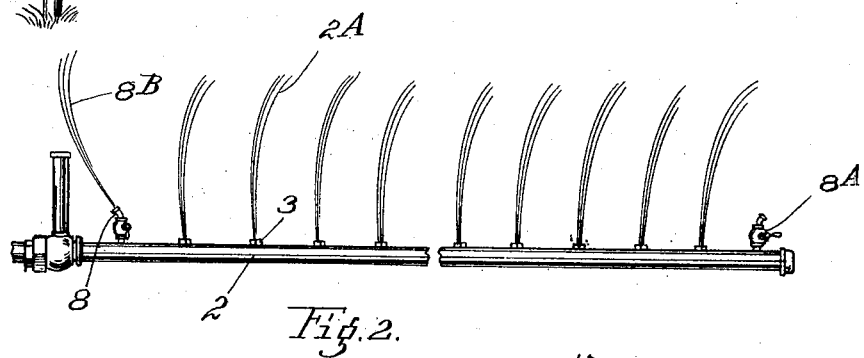
Fig. 2 is a diagrammatic view showing the area covered by a sprinkling line under the influence of the wind.

As shown in Fig. 2, a wind blowing in the direction of the arrows will deflect all of the jets, $2^A$, from the regular spray nozzles so that a space is left near the end of the pipe which receives no water. Under such circumstances the angled nozzle 8 is turned on and the nozzle, $8^A$, at the other end of the sprinkling line turned off. The wind will then deflect the jet $8^B$, from the nozzle 8 in such a way as to cause it to cover with water the space which the usual nozzles cannot reach, due to the wind.

The particular feature of the nozzle resides in the fact that it is turned at an angle to the radius of the pipe of the sprinkling line, and that it is possible to turn it off, and on, independent of the normal water supply of the rest of the pipe. The nozzle should, however, be of an efficient type, such as my patented nozzle above referred to, because a mere make-shift would not give that fine distribution of water which is necessary for proper overhead irrigation.

Figure 4:
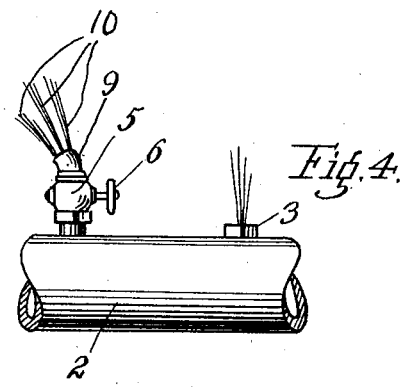
Fig. 4 is a detail elevation of modified form of end nozzle.

In lieu of the single nozzle, I may also provide a plurality of jets to prevent the over-accumulation of the spray into large drops due to the wind. Such a nozzle might, for example, be made as in Fig. 4, where the three-fold nozzle pipe fitting 9 is used, having spray holes at ten, twentytwo and one-half degrees and thirtyfive degrees from the perpendicular, through jets 10.

Having thus described my invention, what I claim as new and desire to secure by Letters Patent, is:—

1. In an overhead irrigating system for sprinkling a fixed area regardless of wind variations, the combination of a sprinkling element adapted to spray a plurality of fine jets of water parallel to each other for covering such area in the absence of wind deflection, and a sprinkling element adapted to normally direct its spray outside of the area desired to be covered, at an angle to normal jets and on a line calculated to bring the spray from said element within said area upon wind deflection.

2. An overhead irrigating system comprising a sprinkling pipe located within an area desired to be sprinkled, having distributed nozzles through its length for throwing fine sprays of water parallel to each other on a perpendicular plane to the pipe for covering said area, of terminal nozzles for such pipe adapted to direct sprays at divergent angles to the remaining nozzles and outside of the area desired to be covered, said nozzles having means for cutting off the water therefrom independent from the remaining nozzles in said pipe, and said angular direction of the terminal nozzles being calculated for normal wind deflection to bring their spray within the desired area.

3. In an overhead irrigating system, the combination with a revoluble sprinkling pipe, having spray nozzles distributed equidistantly along its length for throwing fine jets of water parallel to each other, and spaced so as to evenly cover the entire area traversed by the pipe with an equal amount of water, of a terminal nozzle for such pipe, adapted to direct its spray at a divergent angle to the remaining nozzles and outside of the area desired to be covered, but calculated to be overcome by the wind, said nozzle having means for cutting off the water therefrom independent from the remaining nozzles in said pipe, whereby said terminal nozzle can be employed to sprinkle that portion of the windward side of the area which would otherwise be deprived of water by deflecting action of the wind on the spray from the remaining nozzles.

4. In an overhead irrigating system, the combination with a revoluble sprinkling pipe, having spray nozzles distributed equidistantly along its length for throwing fine jets of water parallel to each other, and spaced so as to evenly cover the entire area traversed by the pipe with an equal amount of water, of a terminal nozzle for such pipe, comprising a series of openings at varying angles, adapted to direct its spray at divergent angles to the remaining nozzles and outside of the area desired to be covered, but calculated to be overcome by the wind, said nozzle having means for cutting off the water therefrom independent from the remaining nozzles in said pipe, whereby said terminal nozzle can be employed to sprinkle that portion of the windward side of the area which would otherwise be deprived of water by deflecting action of the wind on the spray from the remaining nozzles.

WALTER H. COLES.